H. MURRAY.
ANIMAL CONTROL DEVICE.
APPLICATION FILED JAN. 27, 1915.

1,166,708.

Patented Jan. 4, 1916.

Inventor
HENRY MURRAY

Witnesses

By Watson E. Coleman
Attorney

COLUMBIA PLANOGRAPH CO., WASHINGTON, D. C.

UNITED STATES PATENT OFFICE.

HENRY MURRAY, OF VIRGINIA, ILLINOIS.

ANIMAL-CONTROL DEVICE.

1,166,708.

Specification of Letters Patent.

Patented Jan. 4, 1916.

Application filed January 27, 1915. Serial No. 4,695.

*To all whom it may concern:*

Be it known that I, HENRY MURRAY, a citizen of the United States, residing at Virginia, in the county of Cass and State of Illinois, have invented certain new and useful Improvements in Animal-Control Devices, of which the following is a specification, reference being had to the accompanying drawings.

This invention relates to new and useful improvements in animal control devices and more particularly to what is known as a horse twitch, the main object of the present invention being the provision of a device of the above character which can be quickly and readily applied to an animal's mouth, preferably the upper lip thereof, so that the animal can be readily controlled.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claim.

Figure 1:
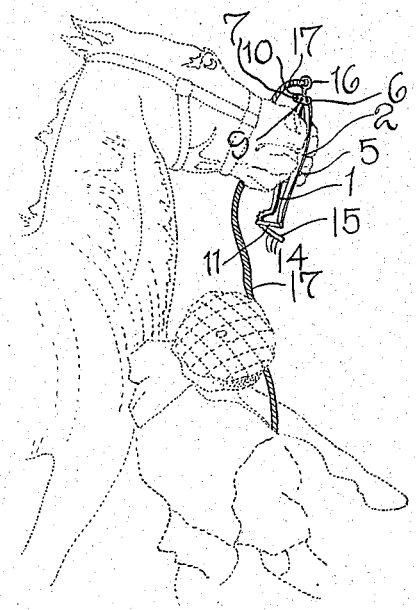
Figure 1:
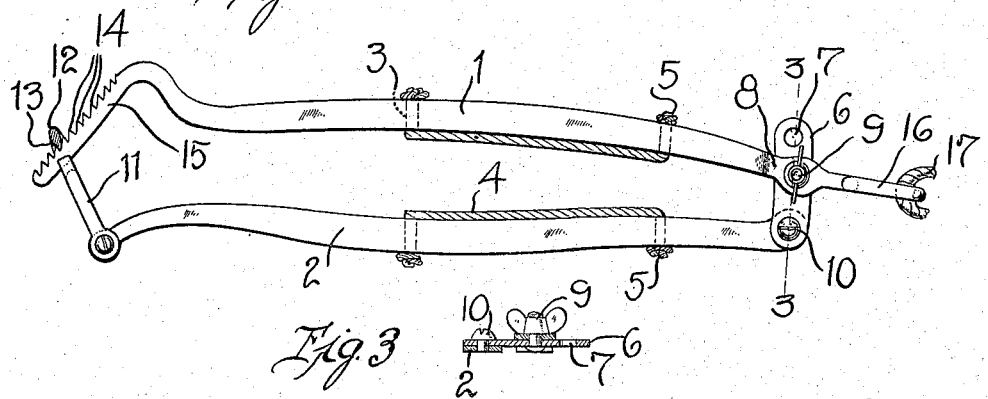

In the accompanying drawing forming a part of this application, Figure 1 illustrates in perspective my improved horse twitch in use. Fig. 2 is a top plan view, parts being broken away and illustrated in cross section; and Fig. 3 is a transverse sectional view taken on the line 3—3, Fig. 2.

In carrying out my invention, I provide two parallel bars generally indicated by the numerals 1 and 2, the intermediate portions of which are slightly bowed and are provided with spaced openings 3, in which are inserted the ends of what will be known as rope pads 4, the ends of said ropes being inserted through the openings 3 and provided with a knot, as shown at 5, whereby to securely hold them in their effective positions. These ropes, when in place, will lie flat up against each of the openings 3 to provide a gripping surface to grasp the portion of the animal to which the device is to be applied.

Pivotally connected to the inner end of the bar 2, by means of the pin 10, is a link member 6, which is provided with a plurality of spaced openings 7 and the inner end of the bar 1 is provided with an offset portion 8 adapted to receive the link member 6 which is movable therein. The link member 6 is pivotally connected with the bar 1 by means of a removable pivot pin 9 which extends down through the bar and through one of the openings 7 in the link. From this it will be apparent that the bars 1 and 2 may be readily moved toward or away from each other upon the pivots 9 and 10 and they may be adjusted laterally by removing the pin 9 and adjusting the inner end of the bar 1 toward or away from the bar 2.

The outer ends of the bars 1 and 2 are securely held in a clamped position by means of a pivoted arm 11, the outer end of which is provided with a loop 12 having a sharpened inner edge 13 which is adapted to be engaged with the teeth 14 on the rigid arm 15 which is formed upon the outer end of the bar 1. From this it will be apparent that when it is desired to adjustably connect the outer ends of the bars 1 and 2, the loop 12 is engaged over the arm 15 and the sharpened edge thereof will engage with the teeth 14, whereby to securely hold the two bars in a clamping position. The inner end of the bar 1 is provided with a loop 16 and connected to this loop, is a rope or strap which is generally indicated by the numeral 17, so that after the clamp has been applied to the animal, the end of the rope or strap 17 may be readily tied to securely hold the animal while being shod or harnessed or for any other necessary operation.

From the above description taken in connection with the accompanying drawing, it will be readily apparent that I have provided a simple and durable horse twitch which is to be used upon unruly horses or other animals and which, at the same time, can be readily and quickly applied for use and readily removed. It will be noted that in applying my improved twitch the rope pads 4 will be arranged upon opposite sides of the upper lip of the animal, as shown in Fig. 1 and the bars 1 and 2 then clamped together by engaging the loop 12 around the arm 15 and pressing the same upwardly until the bars 1 and 2 are tightly engaged with that portion of the animal to which the device is applied. In releasing the same, the arm 15 can be pressed downwardly within the loop 12, so as to disengage the sharpened edge of the loop from the teeth 14.

The device, as herein shown and described, is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claim.

Having thus described my invention, what I desire to claim and secure by Letters Patent, is:—

A device of the class described including spaced bars having openings therein, friction creating pad members having their ends secured within said openings, means for pivotally connecting the bars at one of their ends, and means for detachably and adjustably connecting the other ends of said bars, as and for the purpose set forth.

In testimony whereof I hereunto affix my signature in the presence of two witnesses.

HENRY MURRAY.

Witnesses:
J. R. SLIGH,
F. W. FINN.

Copies of this patent may be obtained for five cents each, by addressing the "Commissioner of Patents, Washington, D. C."